United States Patent
Honda

(10) Patent No.: US 7,532,156 B2
(45) Date of Patent: May 12, 2009

(54) RADAR APPARATUS

(75) Inventor: Kanako Honda, Kobe (JP)

(73) Assignee: Fujitsu Ten Limited, Kobe-shi (JP)

( * ) Notice: Subject to any disclaimer, the term of this patent is extended or adjusted under 35 U.S.C. 154(b) by 231 days.

(21) Appl. No.: 11/562,532

(22) Filed: Nov. 22, 2006

(65) Prior Publication Data

US 2007/0115168 A1    May 24, 2007

(30) Foreign Application Priority Data

Nov. 22, 2005   (JP)   ............... 2005-337251

(51) Int. Cl.
*G01S 7/40* (2006.01)
(52) U.S. Cl. .................... 342/173; 342/174; 342/70
(58) Field of Classification Search ............ 342/70–72, 342/173, 174
See application file for complete search history.

(56) References Cited

U.S. PATENT DOCUMENTS

| 3,205,493 | A | * | 9/1965 | Cohen ................ 342/198 |
| 5,146,190 | A | * | 9/1992 | Firmain ................ 333/117 |
| 6,009,335 | A |   | 12/1999 | Murphy |
| 7,439,905 | B2 | * | 10/2008 | Honda et al. ............ 342/174 |
| 2006/0055593 | A1 | * | 3/2006 | Honda et al. ............ 342/174 |
| 2006/0208940 | A1 | * | 9/2006 | Honda ................ 342/175 |
| 2007/0115168 | A1 | * | 5/2007 | Honda ................ 342/173 |
| 2007/0182619 | A1 | * | 8/2007 | Honda et al. ............ 342/80 |
| 2008/0106458 | A1 | * | 5/2008 | Honda et al. ............ 342/59 |
| 2008/0272959 | A1 | * | 11/2008 | Meharry et al. ........... 342/174 |
| 2008/0297400 | A1 | * | 12/2008 | Hansen et al. ............ 342/70 |

FOREIGN PATENT DOCUMENTS

| EP | 1607763 | 12/2005 |
| JP | 03-052427 | 3/1991 |
| JP | 03-106481 | 5/1991 |
| JP | 06-308225 | 11/1994 |
| JP | 09214391 | 8/1997 |
| JP | 11-205207 | 7/1999 |
| JP | 11284553 | 10/1999 |
| JP | 2001-127680 | 5/2001 |
| JP | 05-327568 | 10/2003 |
| JP | 2003283403 | 10/2003 |
| WO | 03076961 | 9/2003 |

OTHER PUBLICATIONS

Japanese Patent Office, Office Action mailed Oct. 14, 2008, Published in: JP.

* cited by examiner

*Primary Examiner*—John B Sotomayor
(74) *Attorney, Agent, or Firm*—Fogg & Powers LLC

(57) ABSTRACT

In a radar apparatus having a plurality of antennas having switches respectively, malfunctions of the switches are detected by comparing the reception signal levels of the respective antennas with one another. Specifically, if the difference among the reception signal levels is at least a predetermined value, it is determined that at least one switch malfunctions so as not to be turned ON. Moreover, if the difference among the signal levels is smaller than the gain difference of each antenna and is substantially the same, it is determined that there is a malfunction in which all of the compared switches are not turned OFF. In addition, in an OFF state of each switch, if a reception signal of a predetermined level or more is detected, it is determined that there is a malfunction in which at least one switch is not turned OFF.

12 Claims, 10 Drawing Sheets

FIG. 1   FIGURE FOR EXPLAINING THE PHASE MONOPULSE SYSTEM

PRIOR ART

RADAR APPARATUS

CROSS-REFERENCE TO RELATED APPLICATIONS

This application is based upon and claims the benefit of priority from the prior Japanese Patent Application No. 2005-337251, filed on Nov. 22, 2005, the entire contents of which are incorporated herein by reference.

BACKGROUND OF THE INVENTION

1. Field of the Invention

The present invention relates to a radar apparatus provided with a switch for selecting any of the signals received by a plurality of antennas respectively, and particularly to a radar apparatus capable of detecting a malfunction of the switch.

2. Description of the Related Art Prior Art

As a method of determining the direction of a target, a phase monopulse system for computing the target from the phase difference between the reflected waves received by two antennas is known.

FIG. 1 is a figure for explaining the phase monopulse system. As shown in FIG. 1, a phase monopulse radar apparatus receives reflected wave from an object by using two receiving antennas to determine the angular direction θ of the target from the phase difference φ between [the both receiving antennas] by using the following formula:

$$\theta = \sin^{-1}(\lambda\phi/2\pi d_0) \quad (1)$$

wherein, λ is the wavelength of a radar wave, and $d_0$ is the interval between the antennas.

As an in-car radar, an FM-CW radar is used in which a transmission wave subjected to FM modulation with a triangular wave is used to obtain the distance to and relative speed of an object from the sum and the difference of the frequencies between an ascending section and a descending section of the triangular wave of a beat signal generated by mixing a reception wave with a part of the transmission wave. In this FM-CW radar, the abovementioned reception phase difference φ is computed from a phase value of the peak generated as a result of Fourier transformation of the beat signal.

FIG. 2 is a block diagram showing a configuration of the phase monopulse FM-CW radar apparatus. As shown in FIG. 2, there are disposed three antennas, AT0, AT1 and AT2, and these antennas are preferably disposed at irregular intervals such that, when the wavelength of, for example, a carrier wave is λ, the space between the AT0 and AT1 is 5λ/4 and the space between the AT1 and AT2 is 6λ/4.

A transmission signal, which is outputted from a voltage-controlled oscillator (VCO) 10 and subjected to FM modulation with a triangular wave, is amplified by a transmitting amplifier 14, passes through a circulator 16, and is then transmitted from an antenna. In the radar apparatus shown in FIG. 2, transmission and reception are performed using one of the three antennas, AT0, AT1 and AT2, selected by switches SW0, SW1 and SW2. A reception signal, which is transmitted by the antenna selected by the switches SW0, SW1 and SW2 and received by the antenna selected by the switches SW0, SW1 and SW2, passes through the circulator 16, is amplified by a receiving amplifier 26, and mixed with a part of a transmission wave at a mixer 28, whereby a beat signal is generated. The beat signal generated in the mixer 28 is converted into a digital signal in an A/D converter 32, subjected to fast Fourier transformation (FFT) by a fast Fourier transformation section 34, and then inputted to a CPU 36. The CPU 36 computes a direction, distance to, and relative speed of a target on the basis of a frequency analysis of the beat signal.

When obtaining the reception phase difference φ, two antennas are selected from the three antennas AT0, AT1 and AT2, and, for each peak obtained from a reception signal (reflected wave) of each of the selected antennas, a difference value (phase difference φ) between phases of the corresponding peaks is obtained. For example, a combination of the antenna AT0 and antenna AT1, a combination of the antenna AT0 and antenna AT2, and a combination of the antenna AT1 and antenna AT2 can be taken.

It should be noted that the patent literature 1 (Japanese Patent Application Laid-Open No. H11-205207) discloses a configuration in which, when a predetermined level is not exceeded by the maximum reception level of an antenna which is alternately received, this antenna is judged as abnormal. Furthermore, the patent literature 2 (Japanese Patent Application Laid-Open No. H5-327568) discloses a configuration in which, when the average value of the differences among a plurality of received voltages of antennas is larger than a threshold, the antennas are judged as malfunctioning antennas. The patent literature 3 (Japanese Patent Application Laid-Open No. 2001-127680) discloses a configuration in which the past reception levels received with the same antenna elements are averaged. Moreover, the patent literature 4 (Japanese Patent Application Laid-Open No. H3-52427) listed blow discloses a configuration in which, when two transmission outputs are combined and then outputted because of a malfunction of a diode switch, only the beat frequency of the combined output is detected to detect a malfunction of the diode switch.

On the other hand, in the configuration shown in FIG. 2, since there is one transmitting/receiving path with respect to three antennas, transmission and reception needs to be performed using one antenna in a time division manner. Therefore, one antenna which performs transmission and reception is selected by a switching control of the switches SW0, SW1 and SW2 at each measuring timing.

FIG. 3 is a figure showing a time chart of control signals of the switches for switching transmission and reception of the antennas. In the example shown in FIG. 3, the switching control performed by the switches is repeatedly performed at the subsequent timings t1 to t6 in response to a switching of transmission and reception.

t1: Transmission performed by the antenna AT0
t2: Reception performed by the antenna AT0
t3: Transmission performed by the antenna AT0
t4: Reception performed by the antenna AT1
t5: Transmission performed by the antenna AT0
t6: Reception performed by the antenna AT2

In the case in which the switches are not turned ON/OFF normally due to a malfunction of the switches in such switching control performed by the switches, measurements cannot be carried out accurately. For example, at the timing t2 at which reception is performed by the antenna AT0, the switches SW1 and SW2 of the antennas AT1 and AT2 need to be OFF, but if the antenna AT1 is ON because of a malfunction of the SW1, a beat signal based on a composite signal of signals received by both antenna AT0 and antenna AT1 is generated. As described above, if a switch is not turned OFF when it is supposed to be turned OFF, or if [the switch] is not turned ON when it is supposed to be turned ON because of a malfunction of the switch, measurements cannot be carried out accurately.

SUMMARY OF THE INVENTION

Therefore, an object of the present invention is to provide a radar apparatus capable of detecting a malfunction of a switch for switching transmission and reception performed by a plurality of antennas.

A first configuration of the radar apparatus of the present invention for achieving the above object has: a first antenna; a second antenna; a first switch connected to the first antenna; a second switch connected to the second antenna; a signal processing unit inputted a first signal received by the first antenna and a second signal received by the second antenna via the first switch and the second switch respectively, for obtaining the level of the first signal and the level of the second signal; and a switch malfunction detection unit for detecting a malfunction of the first switch and of the second switch on the basis of the level of the first signal and the level of the second signal.

In a second configuration of the radar apparatus of the present invention, according to the first configuration described above, the level of the first signal and the level of the second signal are each an average value of a plurality of levels of the first signal and a plurality of levels of the second signal which are obtained, respectively, in a plurality of measurements.

In a third configuration of the radar apparatus of the present invention, according to the first configuration described above, the level of the first signal and the level of the second signal are each a peak level of a frequency spectrum obtained by performing frequency analysis on the first signal and the second signal.

In a fourth configuration of the radar apparatus of the present invention, according to the third configuration described above, the peak level is the level of the maximum peak of a plurality of peaks appearing in the frequency spectrum.

In a fifth configuration of the radar apparatus of the present invention, according to the third configuration described above, the peak level is a peak on the frequency spectrum corresponding to a predetermined target whose distance and relative speed are obtained.

In a sixth configuration of the radar apparatus of the present invention, according to any of the first to fifth configurations described above, the switch malfunction detection unit corrects the level of the first signal and the level of the second signal on the basis of a gain difference between the first antenna and the second antenna, and detects a malfunction of the first switch and of the second switch on the basis of the corrected level of the first signal and of the second signal.

In a seventh configuration of the radar apparatus of the present invention, according to the sixth configuration described above, the gain difference includes a gain difference between a path of the first signal having the first switch and a path of the second signal having the second switch, and a gain difference based on pattern characteristics of the first antenna and of the second antenna.

In an eighth configuration of the radar apparatus of the present invention, according to any of the first to seventh configurations described above, when the difference between the level of the first signal and the level of the second signal is at least a predetermined value, the switch malfunction detection unit determines that either the first switch or the second switch malfunctions so as not to be turned ON.

In a ninth configuration of the radar apparatus of the present invention, according to the sixth or seventh configuration described above, when the level of the first signal and the level of the second signal are smaller than the gain difference and substantially equal to each other, the switch malfunction detection unit determines that the first switch and the second switch malfunction so as not to be turned OFF.

In a tenth configuration of the radar apparatus of the present invention, according to any of the first to seventh configurations described above, when a predetermined level or more of the first signal or second signal is detected in an OFF state of the first switch and of the second switch, the switch malfunction detection unit determines that at least one of the first switch and the second switch malfunctions so as not to be turned OFF.

An eleventh configuration of the radar apparatus of the present invention, according to any of the first to tenth configurations described above, further has a warning unit for carrying out a predetermined warning operation on the basis of malfunction detection performed by the switch malfunction detection unit.

A twelfth configuration of the radar apparatus of the present invention has: a first antenna; a second antenna; a first switch connected to the first antenna; a second switch connected to the second antenna; a signal processing unit inputted a first signal received by the first antenna and a second signal received by the second antenna via the first switch and the second switch respectively, for obtaining the level of the first signal and the level of the second signal; and a switch malfunction detection unit for detecting, on the basis of the level of the first signal and the level of the second signal, a malfunction of the first switch and of the second switch, a malfunction of the first antenna and of the second antenna, and a malfunction of a path between the first antenna and the first switch and of a path between the second antenna and the second switch.

In a thirteenth configuration of the radar apparatus of the present invention, according to the twelfth configuration, when the difference between the level of the first signal and the level of the second signal is at least a predetermined value, the switch malfunction detection unit determines that either the first switch or the second switch malfunctions so as not to be turned ON, that either the first antenna or the second antenna malfunctions, or that either the path between the first antenna and the first switch or the path between the second antenna and the second switch malfunctions.

A fourteenth configuration of the radar apparatus of the present invention, according to either the twelfth or thirteenth configuration described above, further has a warning unit for carrying out a predetermined warning operation on the basis of malfunction detection performed by the switch malfunction detection unit.

According to the present invention, in the radar apparatus having a plurality of antennas, at least the reception timing of each of which is switched by a switch, a malfunction of the switch such that it is not turned ON or OFF can be detected.

DETAILED DESCRIPTION OF THE PREFERRED EMBODIMENTS

Hereinafter, embodiments of the present invention are described with reference to the drawings. However, these embodiments are not to limit the technical scope of the present invention.

Figure 1:
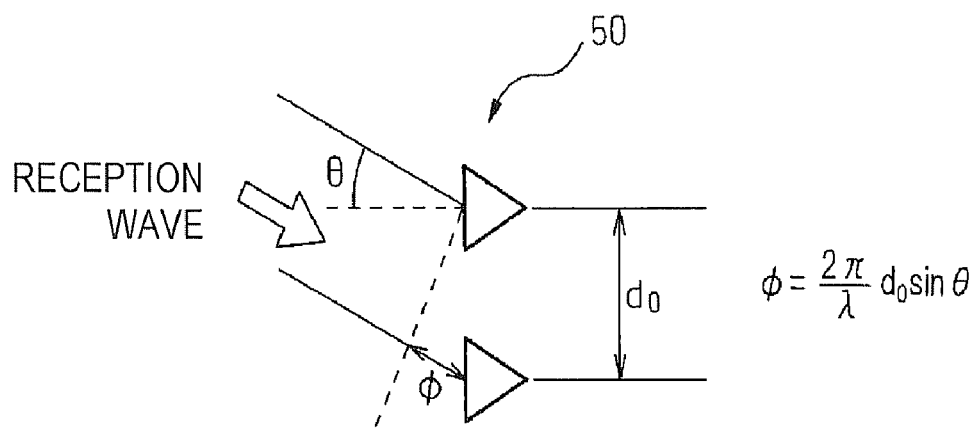
FIG. 1 shows a figure for explaining the phase monopulse system.
Figure 2:
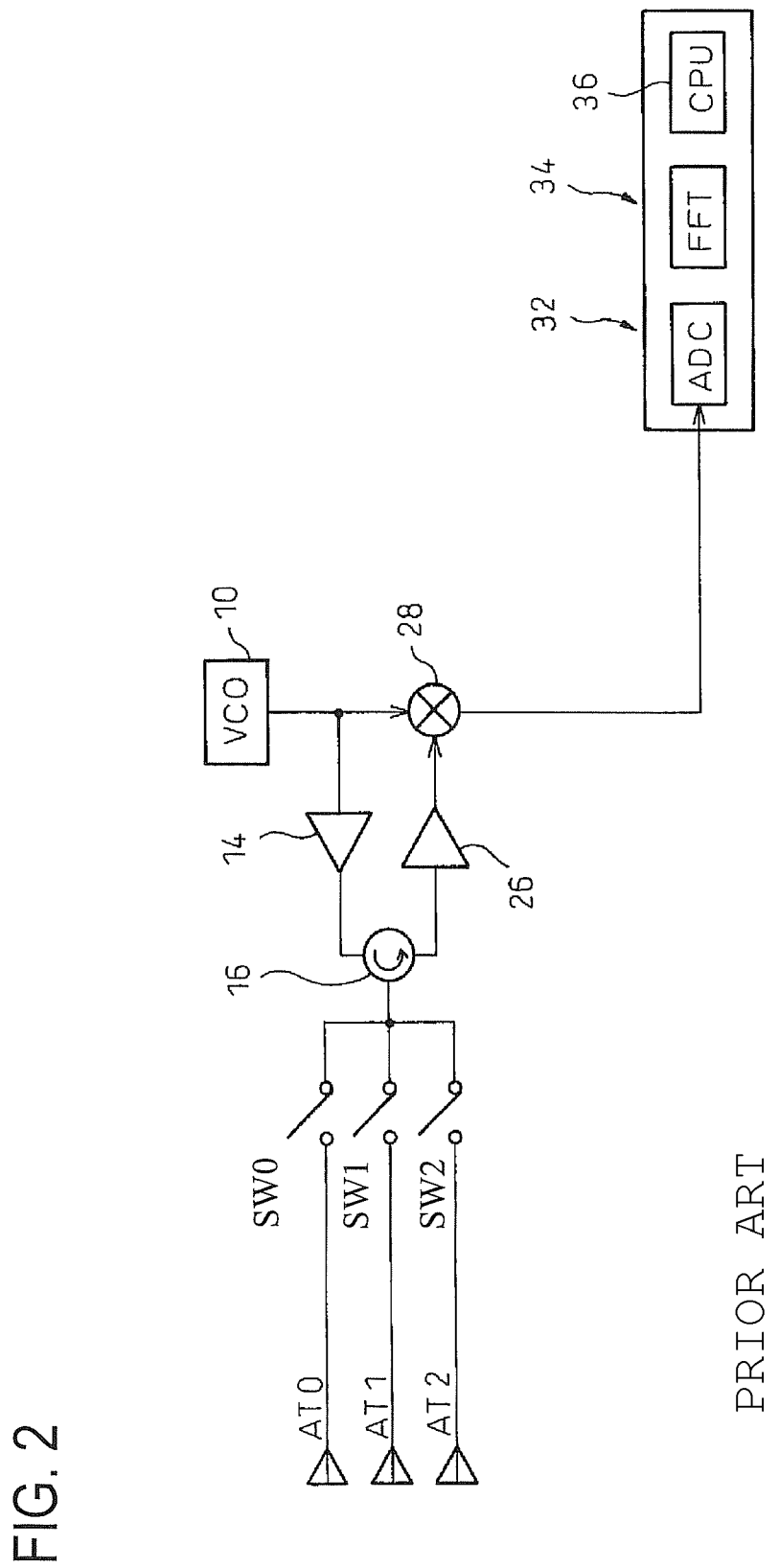
FIG. 2 shows a block diagram showing a configuration of a phase monopulse FM-CW radar apparatus.
Figure 3:
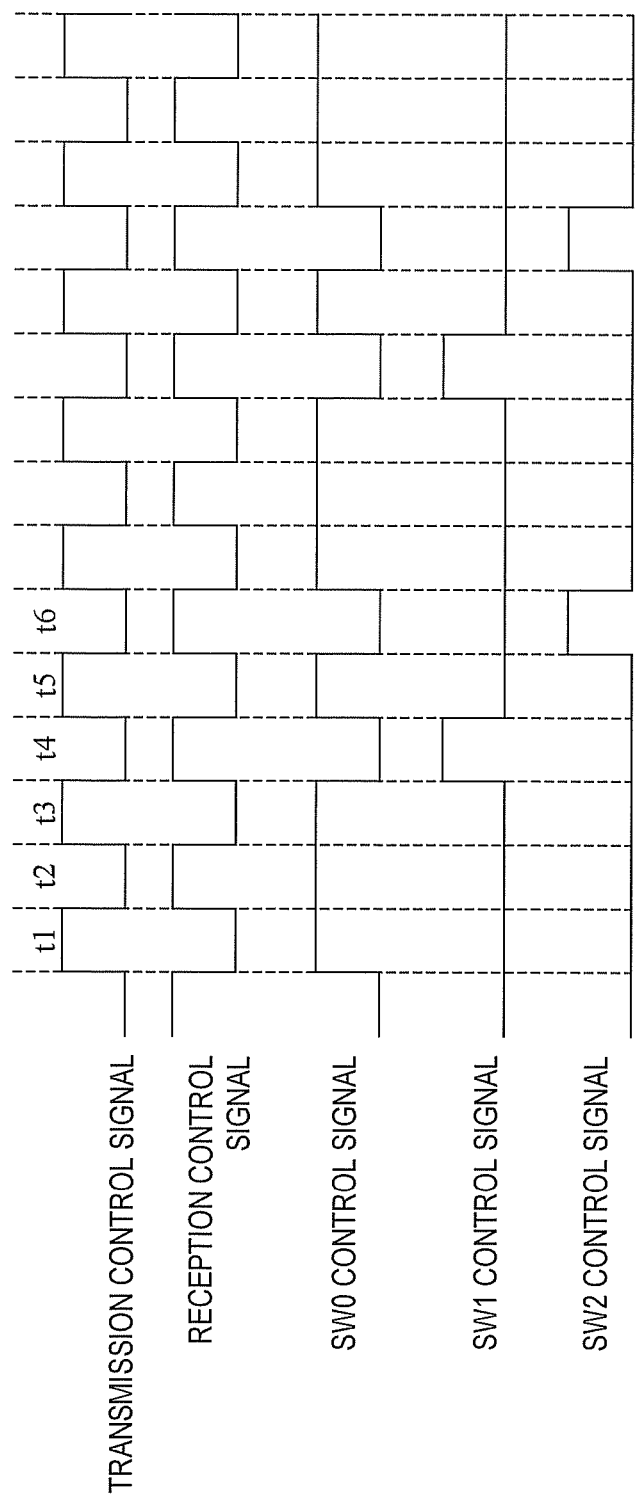
FIG. 3 shows a figure showing a time chart of control signals of the switches for switching transmission and reception of the antennas.

A configuration of the radar apparatus in the present embodiment is same as the configuration shown in FIG. 2, wherein switch malfunction detection in the radar apparatus of the present embodiment is executed by the CPU 36 which subjects a beat signal to frequency analysis. The switch malfunction detection is performed by comparing the signal levels which are obtained every time ON/OFF control of each switch is performed. The ON/OFF control of each switch is performed, for example, the timings shown in FIG. 3 described above, wherein, at the time of reception, the antennas are successively turned ON to measure the reception level of each antenna. The ON/OFF control of each switch is also carried out by the CPU 36. Hereinafter, specific examples are described in detail.

First Embodiment

Figure 4:
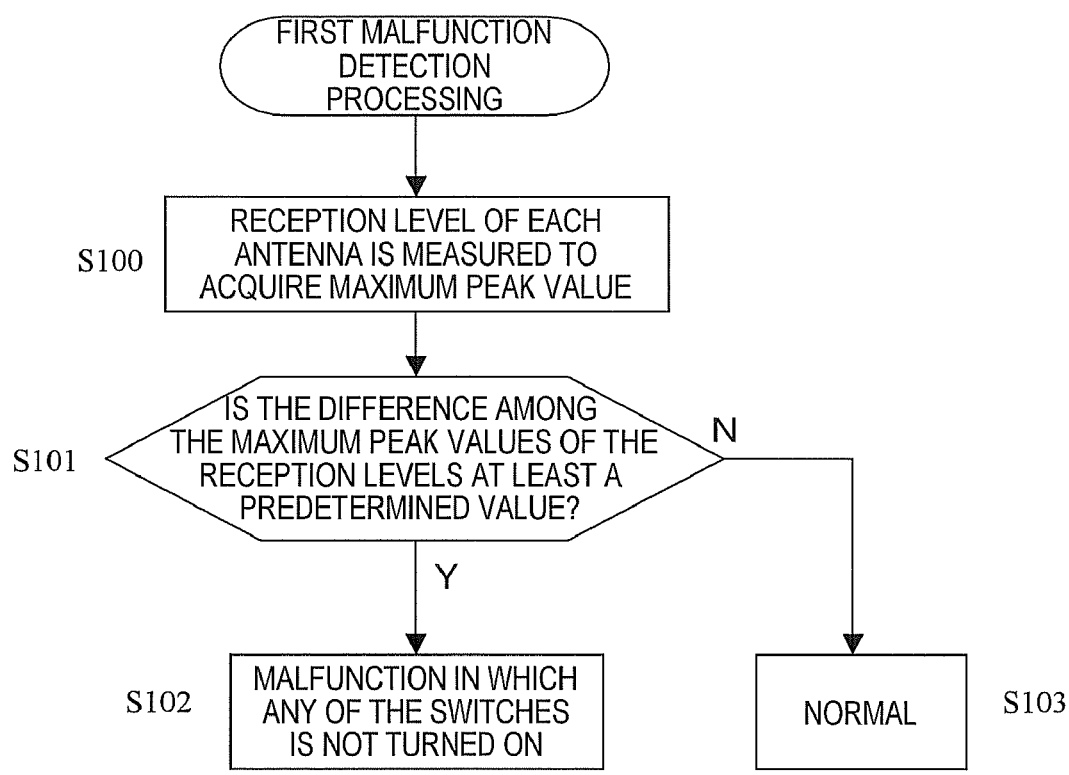
FIG. 4 shows a flowchart of switch malfunction detection processing of the first embodiment of the present invention.

FIG. 4 is a flowchart of switch malfunction detection processing of a first embodiment of the present invention. In the first embodiment, a malfunction in which switch is not ON is detected. First, the reception level of each antenna is measured (S100). Then, in a step S101, the maximum peak value of the reception level of each antenna is obtained, and, when the difference between the maximum peak values is at least a predetermined value, it is determined that any of the switches malfunctions so as not to be turned ON (S102). If [the difference] is less than the predetermined value, it is determined that [the switches are] normal (S103).

Specifically, in the case in which the maximum peak values of the switches SW0, SW1 and SW2 are B0, B1 and B2 respectively, the comparison in the step S101 is performed using the following equation (1) for comparing the difference between the maximum value MAX(B0, B1, B2) and the minimum value MIN(B0, B1, B2) out of the maximum peak values B0, B1 and B2.

$$(\text{MAX}(B0, B1, B2) - \text{MIN}(B0, B1, B2) < k \quad (1)$$

The maximum peak level of the reception level is, for example, a level of the maximum peak out of the peaks appearing in a frequency spectrum obtained as a result of the frequency analysis on a beat signal. By comparing the maximum peak with another, a malfunction can be determined in the most accurate manner. Further, although it is necessary to compare peak levels for the same target, if the switches are turned ON normally at the operation timings of the respective antennas, the same peak level for the same target can be detected for each antenna, thus the maximum peak of each antenna can be considered as the level obtained form the same target. Therefore, a comparison [between the peak levels] is the preferred processing to be performed because it is easy and highly accurate, but when it is determined that the peak is the one from the same target, a malfunction may be detected by comparing peaks which are not the maximum peaks.

Preferably, prior to the peak comparison, it may be confirmed that the peaks to be used in the comparison are from the same target. Specifically, in the case of an FM-CW radar, by using a known computation method, the distance or relative speed corresponding to the peaks to be used in the comparison are obtained, it is then confirmed that these [peaks] are substantially the same (the difference therebetween is less than a predetermined value), and the peak comparison is performed.

On the other hand, in the case in which a switch of an antenna is not turned ON at the operation timing of the antenna because of the occurrence of some sort of abnormalities (in the case in which [the switch] stays OFF), a peak level of the target cannot be obtained from this antenna, whereby the maximum peak value decreases significantly, compared to the maximum peak value of an antenna of a normal switch.

By comparing the peak values of the reception level of each antenna in this manner, a malfunction in which the switch is not ON can be detected.

The reception level of each antenna is measured a plurality of times to obtain an average value of peak values, and a malfunction determination is performed using this average value, whereby a temporal change such as noise can be eliminated and highly accurate determination can be performed.

It should be noted that in the case in which there is a gain difference among the systems of the antennas AT0, AT1 and AT2, the peak values need to be corrected in consideration of this gain difference when comparing the maximum peak values. The gain difference is, for example, a gain difference of a signal path extending from a reception end of an antenna to the mixer 28 generating a beat signal (e.g., in the case in which each of the switches SW0, SW1 and SW2 has an amplifying function and the gain of [such a function] varies according to the switches), and the peak values for the same target differs by the gain difference, thus it is preferred that the peak values be compared in consideration of the gain difference. Specifically, when the gain of the signal path from each of the antennas AT0, AT1 and AT2 is G0, G1 and G2, based on the gain of the path from the antenna AT0:

Gain difference of the antenna $AT0$ offset0=$G0-G0$
=0

Gain difference of the antenna $AT1$ offset1=$G1-G0$

Gain difference of the antenna $AT2$ offset2=$G2-G0$.

Therefore, in place of the above equation (1), the maximum peak values, which are corrected by the gain difference among the antenna, are compared as shown in the following equation (2):

$$(\text{MAX}(B0+\text{offset0}, B1+\text{offset1}, B2+\text{offset2}) - \text{MIN}(B0+\text{offset0}, B1+\text{offset1}, B2+\text{offset2}) < k \quad (2)$$

Moreover, for the gain difference of the above signal path, the gain difference among the antennas AT0, AT1 and AT2 may be added. In the case in which the gains of the antennas themselves are difference due to the individual differences among the antennas, more accurate gain difference can be obtained. In this case, the gain difference of the signal path including each antenna is obtained. However, when including the gains of the antennas, it is necessary to consider the pattern characteristics of the antennas.

Figure 5:
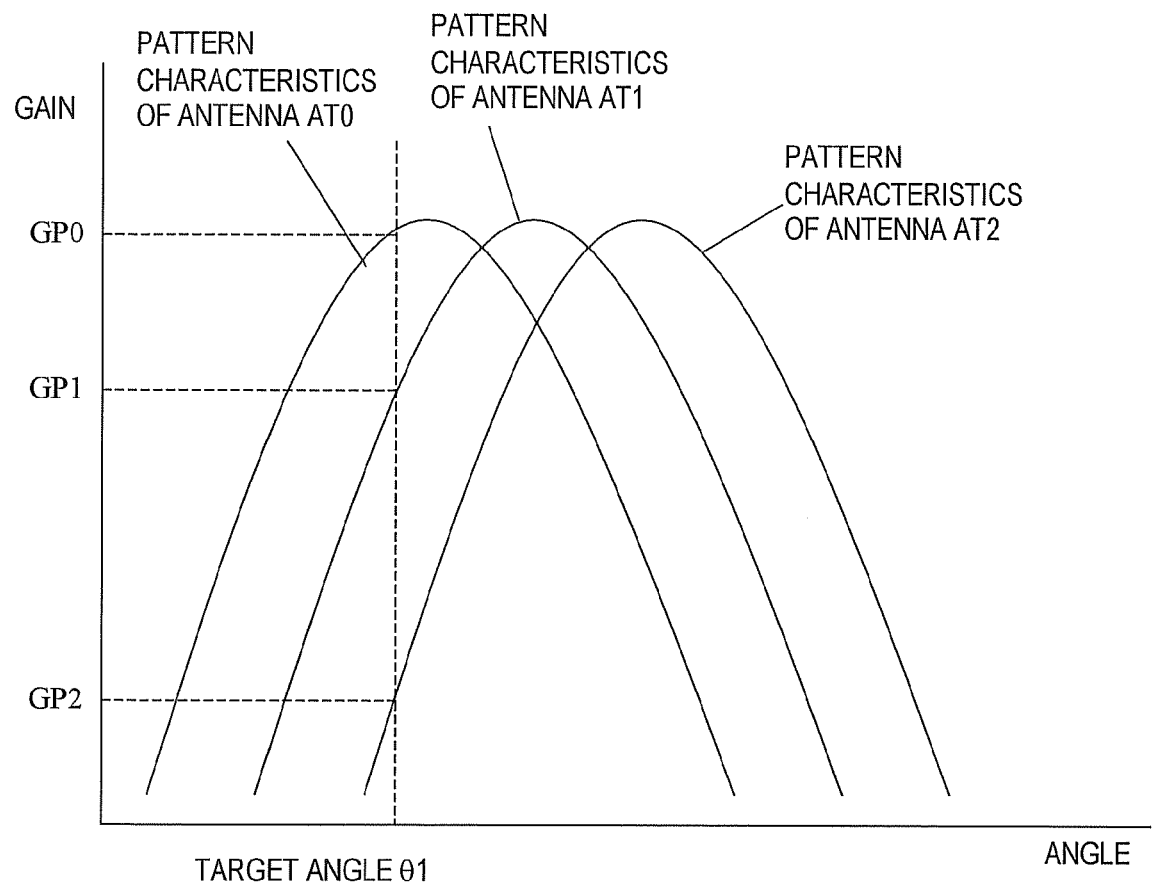
FIG. 5 shows a figure showing an example of the pattern characteristics of the antennas.

FIG. 5 is a figure showing an example of the pattern characteristics of the antennas. As shown in FIG. 5, if the pattern characteristics are difference among the antennas, the gain with respect to the angle of the target becomes different. For example, in the case in which the angle of the target is an angle of θ1, the gains of the antennas AT0, AT1 and AT2 are GP0, GP1 and GP2 respectively. Therefore, the gain difference among the entire systems of the antennas including the gain difference caused by the difference among the pattern characteristics is as follows.

Gain difference of the antenna $AT0$ offset$0$=($G0$+$GP0$)−($G0$+$GP0$)=0

Gain difference of the antenna $AT1$ offset$1$=($G1$+$GP1$)−($G0$+$GP0$)

Gain difference of the antenna $AT2$ offset $2$=($G2$+$GP2$)−($G0$+$GP0$).

It should be noted that when considering the gain difference based on the pattern characteristics of the antennas, it is necessary to obtain the target angle of a peak value used in the comparison, as described above. Therefore, in this case, the target angle is not obtained at the stage where the beat signal is subjected to frequency conversion, thus a specific target angle is obtained by means of a known computation [method] using a phase monopulse system, and then the present malfunction detection processing is performed.

In the case in which the pattern characteristics are substantially the same among the antennas, the gain GP0, GP1 and GP2 of the respective antennas are not changed by the target angle, thus the gain of the signal path including the antennas is measured beforehand. The gain of each system of the antennas AT0, AT1 and AT2 is measured beforehand when assembling the radar apparatus, and is then stored in an internal memory. Accordingly, the gain difference among the antennas can be obtained.

Moreover, in the case in which the pattern characteristics are different among the antennas, an accurate gain may not be obtained if the target angle is within a range of the side lobe in the pattern characteristics, thus it is necessary that the target angle be within a range of the main lobe in the pattern characteristics of each antenna.

Second Embodiment

Figure 6:
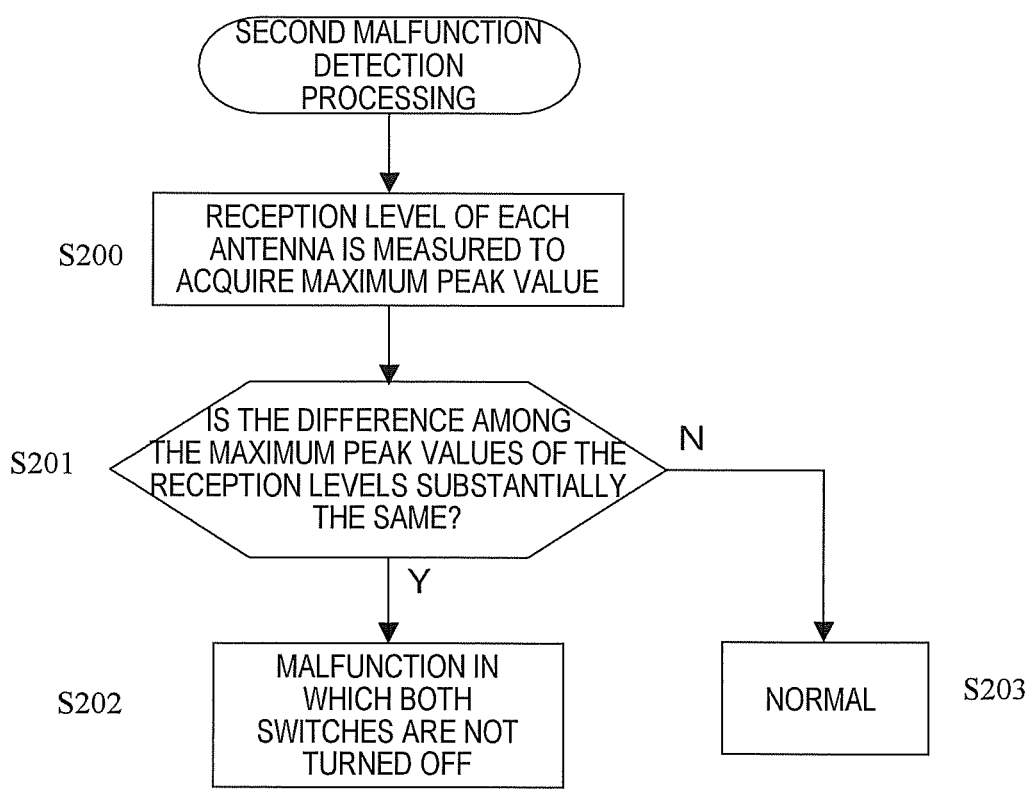
FIG. 6 shows a flowchart of switch malfunction detection processing of the second embodiment of the present invention.

FIG. 6 is a flowchart of switch malfunction detection processing of a second embodiment of the present invention. In the second embodiment, the gain difference among the antennas, which is obtained above, is used to detect a malfunction in which an antenna is not turned OFF. As with the first embodiment, first, the reception level of each antennas is measured (S200). Then, in a step S201 the maximum peak values of the reception levels of selected two antennas are obtained, and, if the difference between the maximum peak values is substantially the same although it is a gain difference, i.e., if [the difference between the maximum peak values] is less than a predetermined value which is smaller than the gain difference between the two antennas, it is determined that the both antennas malfunction such that [the both antennas] are not turned OFF (S202). If there is the difference, the amount of which is substantially the gain difference, it is determined that [the both antennas] are normal (S203).

For example, in the case in which no difference corresponding to the offset offset1 of the antenna AT1 is present between the maximum peak value B0 of the antenna AT0 and the maximum peak value B1 of the antenna AT1, and in which [the maximum peak value B0 of the antenna AT0 and the maximum peak value B1 of the antenna AT1] are substantially the same, it is determined that there is a malfunction in which the both switches SW0 and SW1 are not turned OFF. Since the both switches are not turned OFF, peak values of the same signal obtained by combining reception signals from the antenna AT0 and the antenna AT1 are compared at the timing at which the switch SW0 is turned ON and at the timing at which the switch SW1 is turned ON, whereby no gain difference appears.

In this manner, in the processing in the second embodiment, in the case in which the reception levels of the selected two antennas are substantially the same, it is determined that there is a malfunction in which the both switches of the two antennas malfunction.

Third Embodiment

Figure 7:
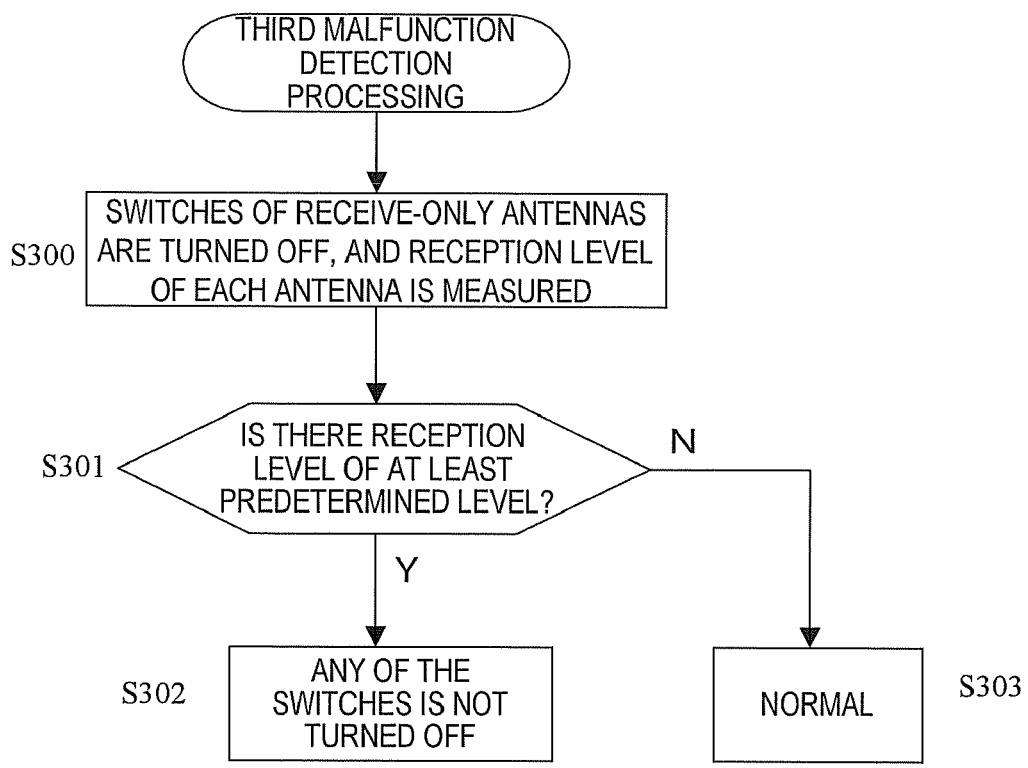
FIG. 7 shows a flowchart of switch malfunction detection processing of the third embodiment of the present invention.

FIG. 7 is a flowchart of switch malfunction detection processing of a third embodiment of the present invention. Unlike the configuration shown in FIG. 2, in the third embodiment, a radar apparatus in which a transmission system is provided separately as shown in FIG. 8 is applied.

Figure 8:
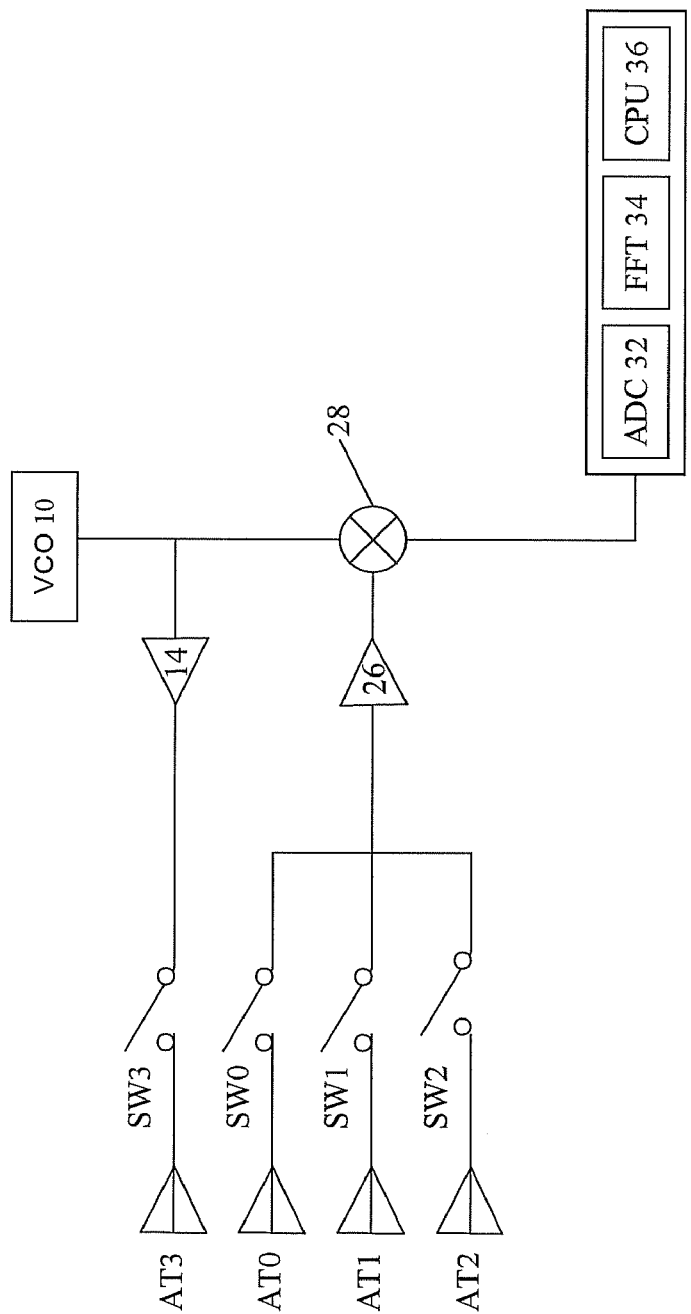
FIG. 8 shows a figure showing other configuration of the radar apparatus.

FIG. 8 is a figure showing other configuration of the radar apparatus. In the configuration shown in FIG. 8, the antennas AT0, AT1 and AT2 are receive-only antennas, and a transmit-only antenna AT3 is provided separately. In such a configuration, in a state in which a transmission signal is transmitted from the transmission antenna AT3, the all switches SW0, SW1 and SW2 of the receive-only antennas AT0, AT1 and AT2 are turned OFF. At this moment, in the case in which a peak of at least a predetermined level is generated although the reception levels are substantially zero, it is determined that there is a malfunction in which any of the switches is not OFF. This is because the levels of the reception signals are detected since one of the switches stays ON.

Therefore, returning to FIG. 7, the switches of the receive-only antennas are turned OFF in a state in which the transmission signal is transmitted from the transmission antenna AT3 (S300), then in such a state the reception levels are measured (S301). It is determined whether or not the reception levels are zero, i.e. whether there exists a reception level of at least the predetermined level (S302). In the case in which [the reception level is zero], it is determined that there is a malfunction in which any of the switches is not turned OFF (S303), and in the case in which [the reception level is not zero], it is determined that [all of the switches] are normal (S304).

Fourth Embodiment

Figure 9:
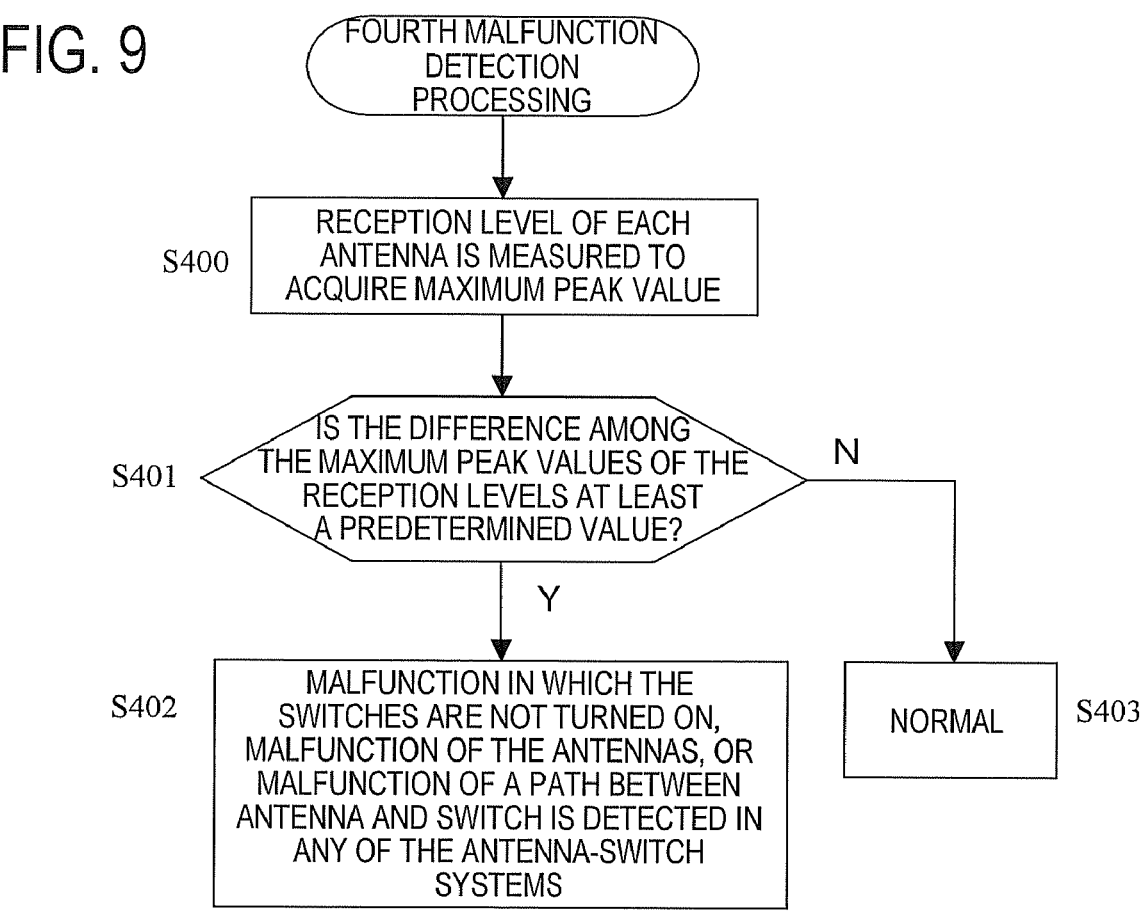
FIG. 9 shows a flowchart of switch malfunction detection processing of the fourth embodiment of the present invention.

FIG. 9 is a flowchart of switch malfunction detection processing of a fourth embodiment of the present invention. The fourth embodiment is a modification of the first embodiment, wherein in the case in which the difference of the maximum peak value among the antennas is at least a predetermined value, it is not determined that one of the switches malfunctions as with the first embodiment, but it is determined that there is a malfunction in a antenna-switch system, i.e., a switch malfunction, an antenna malfunction, or a malfunction in a path between the switch and antenna.

As described in the first embodiment, in the case in which the maximum peak value difference is at least a predetermined value, it is considered that a reception signal was not obtained from at least one antenna. In such a case, it is determined extremely accurately that a reception signal was not obtained because a switch was not turned ON although [the switch] was supposed to be turned ON (basically, there is no problem in an operation even when assuming only a switch malfunction). However, although the possibility of a malfunction of a switch is extremely low, it can be assumed that, besides the switch malfunction, there is a malfunction in the antenna itself or a malfunction in the path between an antenna and switch.

It can be considered that a malfunction of the antenna itself is caused when a reception signal is not outputted because of, for example, a malfunction in an internal circuit of the antenna. Moreover, it can be considered that a malfunction of the path between an antenna and switch is caused by, for example, a disconnection of a signal line between the antenna and switch.

As described above, when assuming that, besides a switch malfunction, there is a malfunction in the antenna or in the path between the antenna and switch, peak values of the reception levels of the antennas are compared, whereby it is determined, in any of the plurality of antenna-switch systems, that a switch malfunction (malfunction in which the switch is not turned ON), an antenna malfunction, or a malfunction in a path between the antenna and switch is caused.

Specifically, in FIG. 9, the reception level of each antenna is measured first (S400). Then, in a step S401 the maximum peak value of the reception level of each antenna is obtained, and, in the case in which the difference among the maximum peak values is at least a predetermined value, it is determined that there is a switch malfunction (malfunction in which the switch is not turned ON), an antenna malfunction, or a malfunction in a path between the antenna and switch is caused in any of the antenna-switch systems (S402). In the case in which [the maximum peak value difference] is less than the predetermined value, it is determined that [the switches] are normal (S403).

Figure 10:
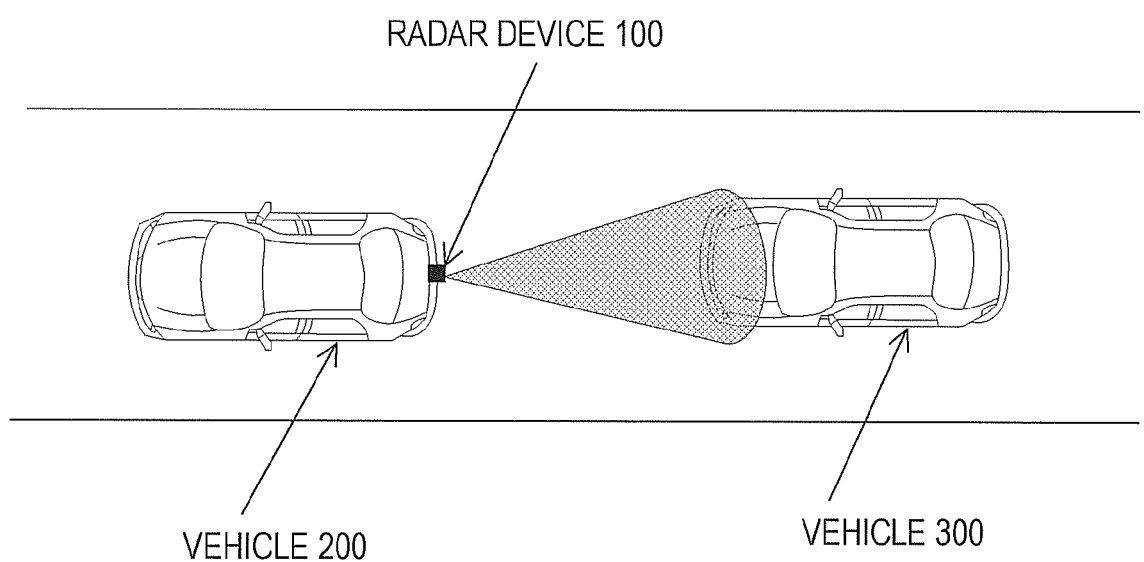
FIG. 10 shows a figure showing an example in which the radar apparatus of the embodiments of the present invention is installed in a vehicle.

FIG. 10 is a figure showing an example in which the radar apparatus of the embodiments of the present invention is installed in a vehicle (automobile). A radar apparatus 100 is set in, for example, a rear bumper of a vehicle 200 to function as a rear radar for detecting a proximity of a vehicle behind 300. Of course, the radar apparatus 100 may be set not only the back of the vehicle but also the front or side, or may be set not only in an automobile but also in other mobile object.

The radar apparatus of the embodiments of the present invention preferably performs a predetermined warning operation for notifying an operator (if the radar apparatus is installed in an automobile) of a case in which a switch malfunction is detected or a case in which any of a switch malfunction, antenna malfunction, and malfunction in a path between a switch and antenna is detected.

For example, in the case in which the radar apparatus is installed in an automobile, [the radar apparatus] performs, as the warning operation, processing of generating an alarm sound, notification processing using a voice, and predetermined processing for displaying a warning on the screen of a meter panel or navigation system in the automobile. Such a warning operation is realized by causing the CPU 36 to execute a computer program provided in advance.

In the radar apparatus of the embodiments of the present invention, the reception levels of a plurality of antennas are compared with each other, whereby a switch malfunction (or any of a switch malfunction, antenna malfunction, and malfunction in a path between a switch and antenna) can be detected, thus it is not necessary to store a normal value of the reception level in advance (or before shipment, for example) or to consider an aging degradation of the radar apparatus, and a malfunction can be detected even while [the vehicle] is moving. Therefore, by carrying out the malfunction detection processing of the embodiments of the present invention as needed or periodically, a malfunction can be detected promptly, an erroneous operation due to a malfunction of the radar apparatus can be prevented from occurring, and the safety of the operator can be secured.

In the processing described in each embodiment, the configuration shown in FIG. 2, i.e., the configuration in which one reception signal processing circuit (a circuit having the reference numerals 26, 28, 32, 34 and 36 in the configuration shown in FIG. 2) is provided for a plurality of antennas is explained as an example. In this configuration, reception signals from the plurality of antennas cannot be processed simultaneously, thus it is necessary to control the transmission and reception timings in a time division manner as described above. On the other hand, in the radar apparatus having a configuration in which the reception signal processing circuit is provided for each of the plurality of antennas, reception signals from the respective antennas can be processed simultaneously by means of the plurality of reception signal processing circuits. The embodiments of the present invention can be applied to such a configuration as well.

Moreover, the embodiments of the present invention can be applied to a radar apparatus having at least two antennas and switches.

What is claimed is:

1. A radar apparatus, comprising:
   a first antenna;
   a second antenna;
   a first switch connected to the first antenna;
   a second switch connected to the second antenna;
   a signal processing unit configured to input a first signal received by the first antenna and a second signal received by the second antenna via the first switch and the second switch respectively, for obtaining the level of the first signal and the level of the second signal, wherein the level of the first signal and the level of the second signal are each an average value of a plurality of levels of the first signal and a plurality of levels of the second signal which are obtained, respectively, in a plurality of measurements; and
   a switch malfunction detection unit for detecting a malfunction of the first switch and of the second switch on the basis of the level of the first signal and the level of the second signal.

2. A radar apparatus, comprising:
   a first antenna;
   a second antenna;
   a first switch connected to the first antenna;
   a second switch connected to the second antenna;
   a signal processing unit configured to input a first signal received by the first antenna and a second signal received by the second antenna via the first switch and the second switch respectively, for obtaining the level of the first signal and the level of the second signal, wherein the level of the first signal and the level of the second signal are each a peak level of a frequency spectrum obtained by performing frequency analysis on the first signal and the second signal; and
   a switch malfunction detection unit for detecting a malfunction of the first switch and of the second switch on the basis of the level of the first signal and the level of the second signal.

3. The radar apparatus according to claim 2, wherein the peak level is the level of the maximum peak of a plurality of peaks appearing in the frequency spectrum.

4. The radar apparatus according to claim 2, wherein the peak level is a peak on the frequency spectrum corresponding to a predetermined target whose distance and relative speed are obtained.

5. A radar apparatus, comprising:
a first antenna;
a second antenna;
a first switch connected to the first antenna;
a second switch connected to the second antenna;
a signal processing unit configured to input a first signal received by the first antenna and a second signal received by the second antenna via the first switch and the second switch respectively, for obtaining the level of the first signal and the level of the second signal; and
a switch malfunction detection unit for detecting a malfunction of the first switch and of the second switch on the basis of the level of the first signal and the level of the second signal;
wherein the switch malfunction detection unit corrects the level of the first signal and the level of the second signal on the basis of a gain difference between the first antenna and the second antenna, and detects a malfunction of the first switch and of the second switch on the basis of the corrected level of the first signal and of the second signal.

6. The radar apparatus according to claim 5, wherein the gain difference includes a gain difference between a path of the first signal having the first switch and a path of the second signal having the second switch, and a gain difference based on pattern characteristics of the first antenna and of the second antenna.

7. The radar apparatus according to claim 5, wherein, when the level of the first signal and the level of the second signal are smaller than the gain difference and substantially equal to each other, the switch malfunction detection unit determines that the first switch and the second switch malfunction so as not to be turned OFF.

8. A radar apparatus, comprising:
a first antenna;
a second antenna;
a first switch connected to the first antenna;
a second switch connected to the second antenna;
a signal processing unit configured to input a first signal received by the first antenna and a second signal received by the second antenna via the first switch and the second switch respectively, for obtaining the level of the first signal and the level of the second signal; and
a switch malfunction detection unit for detecting a malfunction of the first switch and of the second switch on the basis of the level of the first signal and the level of the second signal;
wherein, when the difference between the level of the first signal and the level of the second signal is at least a predetermined value, the switch malfunction detection unit determines that either the first switch or the second switch malfunctions so as not to be turned ON.

9. A radar apparatus, comprising:
a first antenna;
a second antenna;
a first switch connected to the first antenna;
a second switch connected to the second antenna;
a signal processing unit configured to input a first signal received by the first antenna and a second signal received by the second antenna via the first switch and the second switch respectively, for obtaining the level of the first signal and the level of the second signal; and
a switch malfunction detection unit for detecting a malfunction of the first switch and of the second switch on the basis of the level of the first signal and the level of the second signal;
wherein, when a predetermined level or more of the first signal or second signal is detected in an OFF state of the first switch and of the second switch, the switch malfunction detection unit determines that at least one of the first switch and the second switch malfunctions so as not to be turned OFF.

10. A radar apparatus, comprising:
a first antenna;
a second antenna;
a first switch connected to the first antenna;
a second switch connected to the second antenna;
a signal processing unit configured to input a first signal received by the first antenna and a second signal received by the second antenna via the first switch and the second switch respectively, for obtaining the level of the first signal and the level of the second signal; and
a switch malfunction detection unit for detecting, on the basis of the level of the first signal and the level of the second signal, a malfunction of the first switch and of the second switch, a malfunction of the first antenna and of the second antenna, and a malfunction of a path between the first antenna and the first switch and of a path between the second antenna and the second switch.

11. The radar apparatus according to claim 10, wherein, when the difference between the level of the first signal and the level of the second signal is at least a predetermined value, the switch malfunction detection unit determines that either the first switch or the second switch malfunctions so as not to be turned ON, that either the first antenna or the second antenna malfunctions, or that either the path between the first antenna and the first switch or the path between the second antenna and the second switch malfunctions.

12. The radar apparatus according to claim 10, further comprising a warning unit for carrying out a predetermined warning operation on the basis of malfunction detection performed by the switch malfunction detection unit.

* * * * *